United States Patent
Hansen

(10) Patent No.: US 12,503,352 B2
(45) Date of Patent: Dec. 23, 2025

(54) SPARKLING WATER MIXER AND SPARKLING WATER MACHINE

(71) Applicant: CARBON8WATER, INC., Dover, DE (US)

(72) Inventor: Andreas Hansen, Dover, DE (US)

(73) Assignee: CARBON8WATER, INC., Dover, DE (US)

( * ) Notice: Subject to any disclaimer, the term of this patent is extended or adjusted under 35 U.S.C. 154(b) by 164 days.

(21) Appl. No.: 18/432,449

(22) Filed: Feb. 5, 2024

(65) Prior Publication Data

US 2025/0250153 A1    Aug. 7, 2025

(51) Int. Cl.
*B67D 1/00* (2006.01)
*B67D 1/04* (2006.01)

(52) U.S. Cl.
CPC ......... *B67D 1/0059* (2013.01); *B67D 1/0406* (2013.01)

(58) Field of Classification Search
CPC ............................. B67D 1/0059; B67D 1/0406
See application file for complete search history.

(56) References Cited

U.S. PATENT DOCUMENTS

| | | | | |
|---|---|---|---|---|
| 2,663,556 | A * | 12/1953 | Kostka | B67D 1/0406 415/117 |
| 6,345,729 | B1 * | 2/2002 | Santy, Jr. | B67D 1/0052 222/144.5 |
| 12,017,192 | B1 * | 6/2024 | Chen | B01F 23/2362 |
| 2016/0109175 | A1 * | 4/2016 | Mackey | F28F 1/14 62/3.64 |
| 2023/0303378 | A1 * | 9/2023 | Feng | B67D 1/0058 |
| 2023/0405539 | A1 * | 12/2023 | Feng | B01F 27/86 |
| 2025/0250155 | A1 * | 8/2025 | Hansen | B67D 1/0406 |

FOREIGN PATENT DOCUMENTS

| | | | |
|---|---|---|---|
| CN | 120132630 | A * | 6/2025 |
| CN | 120132631 | A * | 6/2025 |

\* cited by examiner

*Primary Examiner* — Bob Zadeh
(74) *Attorney, Agent, or Firm* — Westbridge IP LLC

(57) ABSTRACT

Disclosed are a sparkling water mixer and a sparkling water machine. The sparkling water mixer includes a mixing channel and at least one mixing chamber communicated with the mixing channel, the mixing channel has at least two mixing sections communicated sequentially, the mixing section includes at least two sub-channels connected in parallel, inlets of the sub-channels in the same mixing section are communicated to form an inlet end of the mixing section, and outlets of the sub-channels are communicated to form an outlet end of the mixing section; an input port of the mixing chamber is communicated with an outlet of the mixing channel, and an output port of the mixing chamber is communicated with a liquid outlet of the sparkling water mixer; and a rotatable impeller and an impact part located in a periphery of the impeller and spaced apart from the impeller are provided in the mixing chamber.

14 Claims, 13 Drawing Sheets

SPARKLING WATER MIXER AND SPARKLING WATER MACHINE

TECHNICAL FIELD

The present application relates to the technical field of gas-liquid mixing, and in particular to a sparkling water mixer and a sparkling water machine.

BACKGROUND

Sparkling water is a common and popular beverage currently produced by dissolving large amounts of carbon dioxide in water. The related art mostly uses pressure tank mixing to produce sparkling water. It is necessary to inject carbon dioxide or liquid at a preset pressure into the pressure tank in advance, and then inject high-pressure liquid or carbon dioxide at the sparkling water mixing device to use high-pressure shock to dissolve the carbon dioxide in the liquid. This production method has high requirements for impact pressure such as water pressure or air pressure, is not convenient to use, and uses high-pressure impact method to easily cause the risk of the pressure tank being flushed or ruptured.

SUMMARY

The main purpose of the present application is to provide a sparkling water mixer and a sparkling water machine, aiming to improve the safety and convenience of the sparkling water preparation process and improve the gas-liquid mixing effect.

In order to achieve the above objective, the present application proposes a sparkling water mixer, which includes a mixing channel and at least one mixing chamber communicated with the mixing channel;
  the mixing channel has at least two mixing sections communicated in sequence, the mixing section includes at least two sub-channels connected in parallel, inlets of the sub-channels in the same mixing section are communicated with each other to form an inlet end of the mixing section, and outlets of the sub-channels are communicated with each other to form an outlet end of the mixing section;
  an input port of the mixing chamber is communicated with an outlet of the mixing channel, and an output port of the mixing chamber is communicated with a liquid outlet of the sparkling water mixer; and
  a rotatable impeller and an impact part are provided in the mixing chamber, and the impact part is located in a periphery of the impeller and spaced apart from the impeller.

In an embodiment of the present application, at least one of the sub-channels has a diverting section and a converging section that are sequentially communicated in a flow direction, the diverting section gradually moves away from other sub-channels in the same mixing section in the flow direction, and the converging section gradually approaches other sub-channels in the same mixing section in the flow direction.

In an embodiment of the present application, a flow channel is formed in the sparkling water mixer, at least one diverter is provided in the flow channel, and the sub-channels are formed on both sides of the diverter.

In an embodiment of the present application, the diverter has a diverting part and a converging part that are connected in sequence in the flow direction, the diverting part has a width that gradually increases from the inlet end to a side of the converging part, and the converging part has a width that gradually decreases from the diverting part to the outlet end.

In an embodiment of the present application, at least one of outer walls of the diverting part and the converging part transitions or intersects in an arc to form an edge.

In an embodiment of the present application, one end of the diverting part facing the inlet of the mixing section is a tip or an arc surface.

In an embodiment of the present application, one end of the converging part facing the outlet of the mixing section is a tip or an arc surface.

In an embodiment of the present application, the inlet end has a cross section that gradually increases in a flow direction.

In an embodiment of the present application, the outlet end has a cross section that gradually decreases in the flow direction.

In an embodiment of the present application, the sparkling water mixer further includes a premixing chamber communicated with the inlet of the mixing channel, and the sparkling water mixer is provided with an air inlet and a liquid inlet that are communicated with the premixing chamber.

In an embodiment of the present application, the sparkling water mixer further includes a pressure regulator communicated with the outlet of the mixing chamber.

In an embodiment of the present application, the mixing channel is provided to surround an outer side of the mixing chamber.

In an embodiment of the present application, the sparkling water mixer is provided with at least two mixing chambers that are communicated in sequence, and a communication channel between two adjacent mixing chambers gradually narrows in the flow direction.

In an embodiment of the present application, the sparkling water mixer further includes:
  a base, a surface of the base is recessed to form the mixing channel and the mixing chamber, and an outer wall of the base is provided with an air inlet and a liquid inlet that are communicated with the mixing channel as well as a liquid outlet communicated with the mixing chamber;
  a cover, provided on the surface of the base, the cover is configured to cover the mixing channel and the mixing chamber; and
  a sealing member, sandwiched between the base and the cover, the sealing member is provided to surround a periphery of the mixing channel and the mixing chamber.

The present application also proposes a sparkling water machine, which includes the sparkling water mixer as described in any one of the embodiments.

In the technical solution of the present application, the sparkling water mixer includes the mixing channel and at least one mixing chamber that are communicated sequentially. When two or more mixing chambers are provided, the mixing chambers are communicated in sequence in the gas-liquid flow direction, and the outlet of the mixing channel is communicated with the mixing chamber located at the front end.

Taking the preparation of sparkling water by mixing water and carbon dioxide as an example; when the sparkling water mixer is used to mix gas and liquid to prepare sparkling water, water and carbon dioxide enter the mixing channel together as a gas-liquid mixture and flow along the chain mixing channel. When the gas-liquid mixture enters a first mixing section, the gas-liquid mixture is diverted and separated into at least two gas-liquid mixtures and enters the sub-channels. During the separation process, the gas-liquid mixture hits the side wall of the sub-channel. Then, after the gas-liquid mixture passes through the sub-channel, the gas-liquid mixtures in the sub-channels collide with each other at the outlet of the mixing section, and aggregate again into the gas-liquid mixture. The aggregated gas-liquid mixture then enters the next mixing section and repeats the previous actions of separation, collision, re-aggregation and collision together. As the gas-liquid mixture continues to collide, the surface tension of the water in the gas-liquid mixture will decrease, and the contact area between water and carbon dioxide will become larger, allowing carbon dioxide to dissolve into the water more quickly and the gas-liquid ratio to be more uniform.

After the gas-liquid mixture flows out of the mixing channel and enters the mixing chamber, the gas-liquid mixture will rotate the impeller in the mixing chamber, and the gas-liquid mixture will collide with the impact part provided in the mixing chamber. With the help of the centrifugal force when the impeller rotates and the impact force of the gas-liquid mixture itself, the gas-liquid mixture can collide with the impact part at a higher speed and kinetic energy and stops momentarily, thus generating an instantaneous pressure several times the normal pressure under the action of inertia, further dissolving carbon dioxide in the liquid, improving the solubility of carbon dioxide in the liquid and making the gas-liquid ratio more uniform. When two or more mixing chambers are provided to allow the gas-liquid mixture to repeat the above process, the gas-liquid mixing effect will also be better.

That is, in the technical solution of the present application, by providing the mixing channel and the mixing chamber in the sparkling water mixer, the gas and liquid can be mixed through multiple impacts. Providing the mixing channel reduces the surface tension of the water, allowing carbon dioxide to dissolve into the water more quickly, shortening the time required for the gas-liquid mixture to dissolve, and making the gas-liquid ratio more uniform. The gas-liquid mixture then collides in the mixing chamber, which can increase the solubility of the gas in the liquid. In this way, there is no need to use high-pressure carbon dioxide of up to 5-7 MPa to pour into the liquid storage bottle and mix with the liquid, which avoids the problem of the liquid storage bottle being flushed or ruptured caused by the high-pressure carbon dioxide. Moreover, this solution completely eliminates the liquid storage bottle and adopts an instant mixing method. Users can receive sparkling water directly from the sparkling water mixing device without any other operations, thereby improving the safety and convenience of using the sparkling water mixing device.

BRIEF DESCRIPTION OF THE DRAWINGS

In order to describe the technical solutions in the embodiments of the present application or in the related art more clearly, the accompanying drawings required to be used in the description of the embodiments or the related art will be briefly introduced below. Obviously, the accompanying drawings in the following description are only some embodiments of the present application. For those skilled in the art, other drawings can be obtained based on the structures shown in these drawings without creative efforts.

Figure 1:
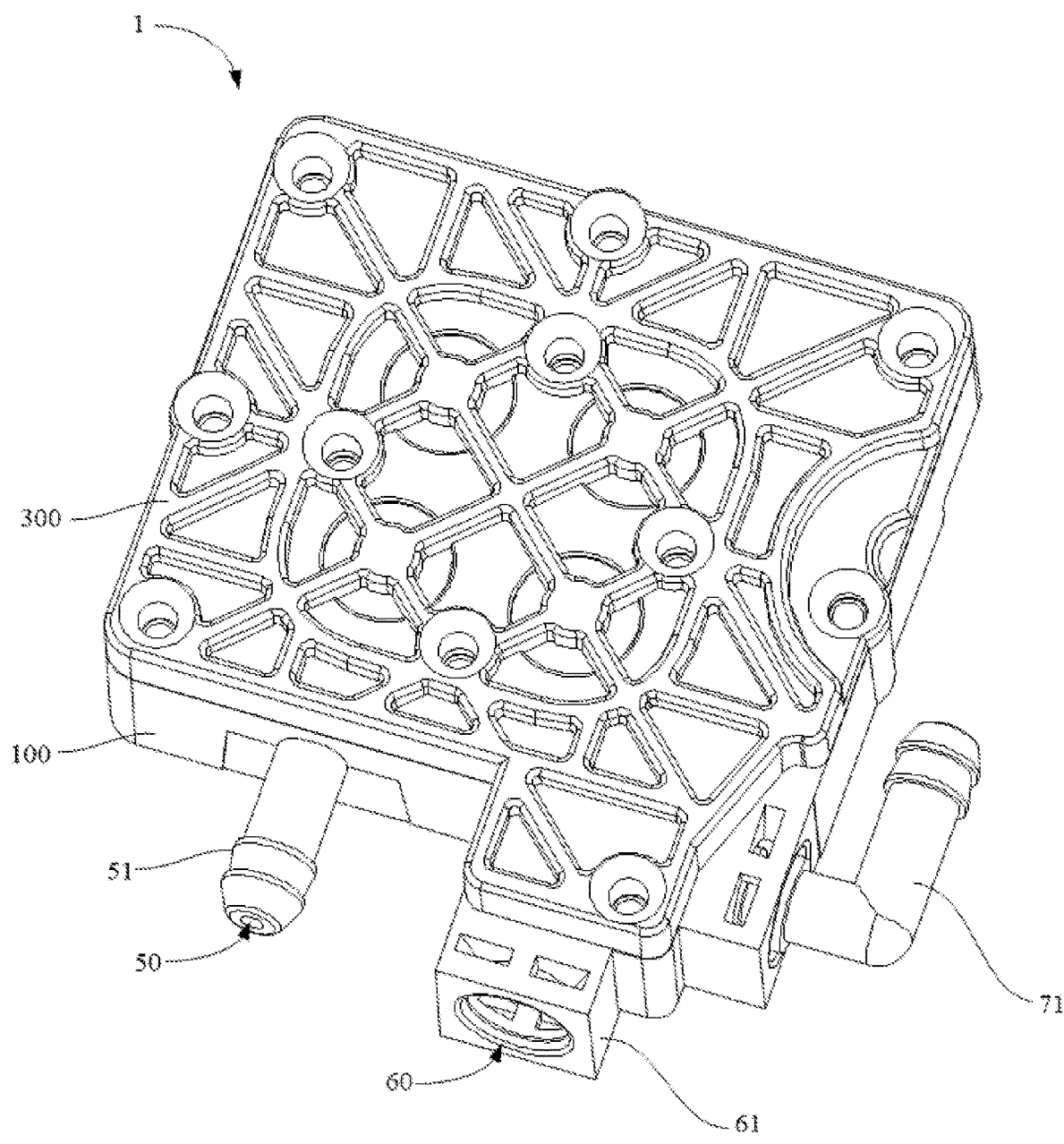
FIG. 1 is a structural view of a sparkling water mixer according to an embodiment of the present application.

The realization of the purpose, functional features and advantages of the present application will be further described in conjunction with the embodiments, with reference to the accompanying drawings.

DETAILED DESCRIPTION OF THE EMBODIMENTS

The technical solutions of the embodiments of the present application will be clearly and completely described below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In the description of the embodiments of the present application, unless otherwise explicitly stipulated and limited, the terms "connected" and "fixed" should be understood in a broad sense. For example, "connected" can be a fixed connection, a detachable connection or an integrated connection, a mechanical connection or an electrical connection, a direct connection or an indirect connection through an intermediate medium, a connection within two components or an interaction between two components, unless explicitly specified otherwise. For those skilled in the art, the specific meanings of the above terms in the embodiments of the present application can be understood in specific situations.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" can expressly or implicitly include at least one of that feature. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application proposes a sparkling water mixer 1.

Figure 2:
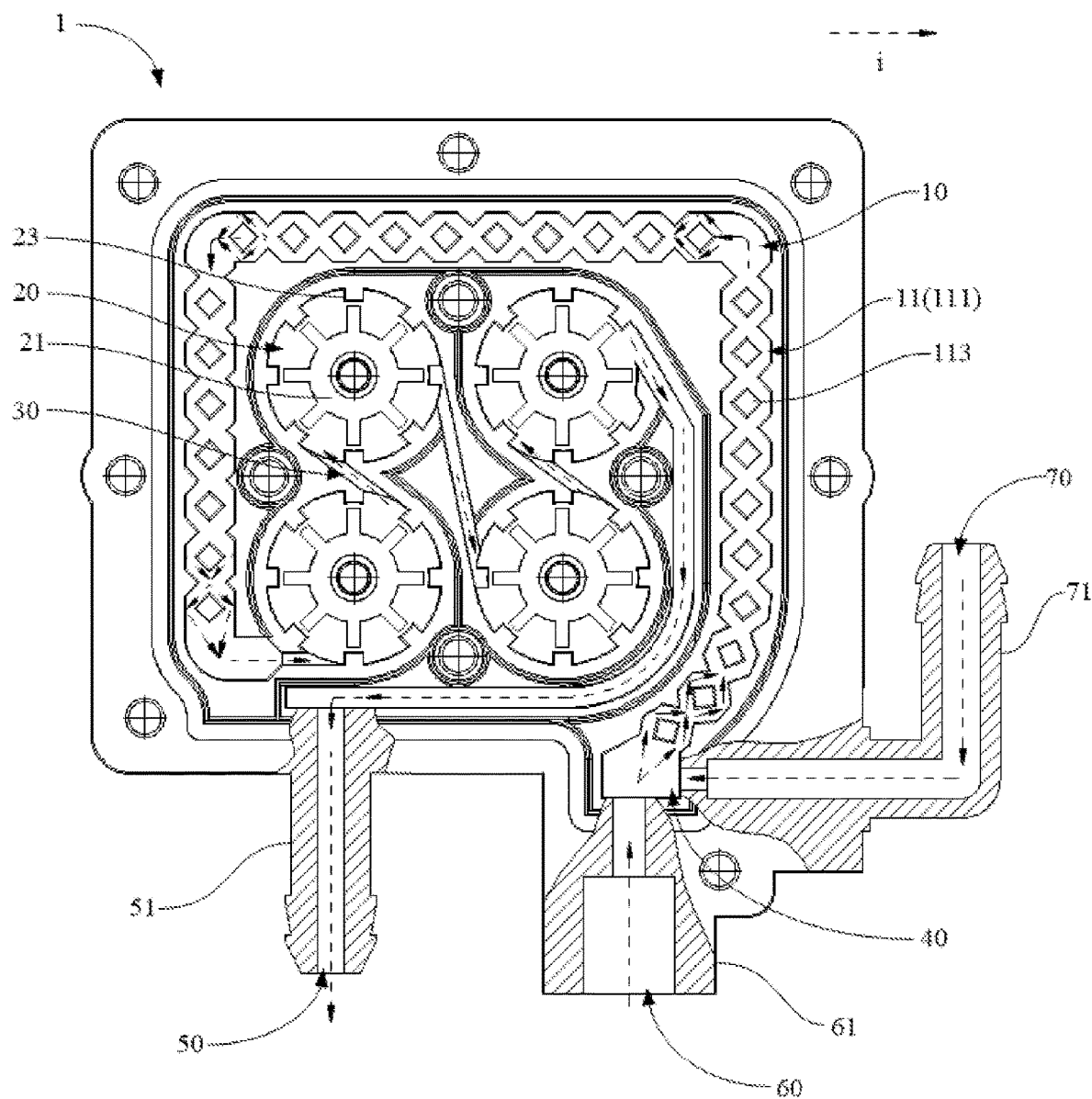
FIG. 2 is a cross-sectional view of the sparkling water mixer according to an embodiment of the present application.

Please refer to FIGS. 1 and 2, in some embodiments of the present application, the sparkling water mixer 1 is formed with a mixing channel 10 and at least one mixing chamber 20 communicated with the mixing channel 10.

The mixing channel 10 has at least two mixing sections 11 communicated in sequence. The mixing section 11 includes at least two sub-channels 111 connected in parallel. Inlets of the sub-channels 111 in the same mixing section 11 are communicated with each other to form an inlet end 115 of the mixing section 11. Outlets of the sub-channels 111 are communicated with each other to form an outlet end 117 of the mixing section 11.

An input port of the mixing chamber 20 is communicated with the outlet of the mixing channel 10, and an output port of the mixing chamber 20 is communicated with a liquid outlet 50 of the sparkling water mixer 1.

In the mixing chamber 20, a rotatable impeller 21 and an impact part 23 located in a periphery of the impeller 21 and spaced apart from the impeller 21 are provided.

The sparkling water mixer 1 proposed in the present application can be used to dissolve gas in liquid to prepare sparkling water. For ease of explanation, in the embodiments of the present application, carbon dioxide and water are described as examples. The sparkling water mixer 1 proposed in the present application can also be used to mix other types of gases and liquids.

The mixing channel 10 and at least one mixing chamber 20 communicated in sequence are formed in the sparkling water mixer 1. When two or more mixing chambers 20 are provided, the mixing chambers 20 are communicated in sequence along the gas-liquid flow direction i. The outlet of the mixing channel 10 is communicated with the mixing chamber 20 located at the frontmost end, and the mixing chamber 20 located at the rearmost end of the flow path is communicated with the liquid outlet 50 of the sparkling water mixer 1. In some embodiments, a liquid outlet joint 51 is provided at the liquid outlet 50 to facilitate connecting pipelines to export sparkling water.

The mixing channel 10 includes at least two mixing sections 11 that are communicated in sequence. Each mixing section 11 includes at least two sub-channels 111 connected in parallel; the parallel connection of each sub-channel 111 means that the inlet of each sub-channel 111 is communicated with each other, and the outlets of the sub-channels 111 are communicated with each other. With this arrangement, after entering the mixing section 11 from the inlet end 115 of the mixing section 11, the gas-liquid mixture will be divided by each sub-channel 111 to form at least two gas-liquid mixtures with the same number as the sub-channels 111. After passing through each sub-channel 111, each gas-liquid mixture will aggregate with each other at the outlet end 117 of the mixing section 11 and collide with each other. The aggregated gas-liquid mixture then enters the next mixing section 11 and repeats the previous actions of separation, collision, re-aggregation and collision together. As the gas-liquid mixture continues to collide, the surface tension of the water in the gas-liquid mixture will decrease. At the same time, the contact area between water and carbon dioxide will become larger, allowing carbon dioxide to dissolve into the water more quickly, and the gas-to-liquid ratio is more uniform.

In this embodiment, at least two sub-channels 111 in the mixing section 11 can be formed by providing at least two conduits, and one sub-channel 111 is formed in each conduit. Alternatively, a flow channel such as a flow groove can be provided, and at least one diverter 113 is provided in the flow channel to divide the flow channel into at least two sub-channels 111.

An impeller 21 is provided in the mixing chamber 20, and an impact part 23 is provided at the periphery of the impeller 21. The impact part 23 is spaced apart from the impeller 21 to avoid affecting the rotation of the impeller 21. When entering the mixing chamber 20 from the mixing channel 10, the gas-liquid mixture will impact the impeller 21 and drive the impeller 21 to rotate. Since carbon dioxide and water have different densities, the gas-liquid mixture in the mixing chamber 20 will tend to form a stratified configuration under the action of gravity, resulting in water-gas stratification, thereby reducing the total contact area between the gas phase and the liquid phase and reducing the chance of carbon dioxide dissolving in the liquid. When the impeller 21 rotates, the blades arranged along the circumferential direction of the impeller 21 will rotate accordingly to continuously separate, equally divide two-phase flow of gas-liquid and destroy the water-gas stratification to form a finely dispersed system, which can evenly disperse small droplets or bubbles in the continuous phase, so that carbon dioxide can fully contact the liquid, improving the dissolution effect of carbon dioxide.

In addition, after the gas-liquid mixture enters the mixing chamber 20, some of the gas-liquid mixture will also impact the impact part 23. The gas-liquid mixture will also be thrown toward the impact part 23 and collide with the impact part 23 under the centrifugal action of the impeller 21 when the impeller 21 rotates. The gas-liquid mixture itself has a high momentum, and part of the gas-liquid mixture relies on the centrifugal force of the impeller 21 to cause the gas-liquid mixture to impact the impact part 23 at a high speed. The part of the gas-liquid mixture that collides the impact part 23 will stop flowing instantly and convert its own kinetic energy into momentum. The gas-liquid mixture will undergo a high momentum change in a short time, and an impact force much higher than normal pressure is formed on the impact part 23, thereby generating a dissolution pressure much higher than the normal pressure in an instant, which increases the solubility of carbon dioxide in the liquid.

When the part of the gas-liquid mixture that collides with the impact part 23 will stop flowing instantly, other gas-liquid mixtures immediately adjacent to that part will still maintain their original motion state due to inertia, so it is possible to compress the part of the gas-liquid mixture that collides with the impact part 23 and form a high-pressure surface with high energy density and very large local pressure at the impact part 23, thereby also increasing the solubility of carbon dioxide in the liquid.

It can be understood that when carbon dioxide and water are mixed through the sparkling water mixer 1, and then the sparkling water is discharged from the sparkling water mixer 1, there may also be some carbon dioxide that is not dissolved in the water, and the undissolved carbon dioxide will also be discharged from the liquid outlet 50 of the sparkling water mixer 1 along with the sparkling water formed. Therefore, the liquid outlet 50, liquid inlet 70 and air inlet 60 proposed in the embodiments of the present application do not limit the positions to only being used for the flow of pure liquid or pure gas. Depending on different usage environments and requirements, these positions can also be used for the flow of gas-liquid mixtures, solid-liquid mixtures, solid-gas mixtures or other types of mixtures.

Therefore, it can be understood that, in the technical solution of the present application, the mixing channel 10 and at least one mixing chamber 20 communicated sequentially are formed in the sparkling water mixer 1. When two or more mixing chambers 20 are provided, the mixing chambers 20 are communicated sequentially in the gas-liquid flow direction i, and the outlet of the mixing channel 10 is communicated with the mixing chamber 20 located at the frontmost end.

When the sparkling water mixer 1 is used to mix gas and liquid to prepare sparkling water, the gas and liquid can be mixed through multiple impacts. By providing the mixing channel 10, the surface tension of water is reduced, allowing carbon dioxide to dissolve into the water more quickly, shorten the time required for the dissolution of the gas-liquid mixture, and make the gas-liquid ratio more uniform. The gas-liquid mixture then collides in the mixing chamber 20, which can increase the solubility of the gas in the liquid. In this way, there is no need to use high-pressure carbon dioxide of up to 5 MPa to 7 MPa to pour into the liquid storage bottle and mix with the liquid, which avoids the problem of the liquid storage bottle being flushed or ruptured caused by the use of high-pressure carbon dioxide, and this solution completely eliminates the liquid storage bottle and adopts an instant mixing method. Users can take the sparkling water directly from the sparkling water mixing device without any other operations, thereby improving the safety and convenience of using the sparkling water mixing device.

In an embodiment of the present application, at least one sub-channel 111 has a diverting section 1111 and a converging section 1113 that are sequentially communicated in the flow direction i. The diverting section 1111 gradually moves away from other sub-channels 111 in the same mixing section 11 in the flow direction i, and the converging section 1113 gradually approaches other sub-channels 111 in the same mixing section 11 in the flow direction i.

In this embodiment, taking the mixing section 11 including two parallel sub-channels 111 as an example, the middle part of at least one sub-channel 111 can be convex in a direction away from the other sub-channel 111. Both sub-channels 111 can also be set as convex structures. With this arrangement, the convex sub-channel 111 forms at least two sections of structure, one section of which is the diverting section 1111 and is connected to the inlet end of the mixing section 11, and the other section is the converging section 1113 and is connected to the outlet end 117 of the mixing section 11. The diverting section 1111 extends from the inlet end to the converging section 1113 and gradually moves away from the other sub-channel 111. The converging section 1113 extends towards the outlet end 117 and gradually approaches the other sub-channel 111. With this arrangement, when the gas-liquid mixture flows out from the converging section 1113 of the sub-channel 111, under the guidance of the converging section 1113, the gas-liquid mixture rushes toward the gas-liquid mixture flowing out of other sub-channels 111, increasing the impact force between various gas-liquid mixtures. this can effectively reduce the surface tension of water in the gas-liquid mixture, and allow each gas-liquid mixture to fully collide, accelerating the dissolution efficiency and uniformity of carbon dioxide.

It should be noted that in this embodiment, the convex flow channel structure can be that the entire sub-channel 111 is an arc-shaped channel, or that the diverting section 1111 and the converging section 1113 are two section straight channel arranged at an angle. In addition, taking the two sub-channels 111 as a first sub-channel 111 and a second sub-channel 111, it is defined that the first sub-channel 111 has two opposite side walls, one of which is close to the second sub-channel 111, and the other side wall is located on the side away from the second sub-channel 111. The middle part of the side wall of the first sub-channel 111 close to the second sub-channel 111 is convex in a direction away from the second sub-channel 111, while the side wall away from the second sub-channel 111 is not restricted. Similarly, the first sub-channel 111 can have a diverting section 1111 gradually moving away from the second sub-channel 111 and a converging section 1113 gradually approaching the second sub-channel 111.

If the mixing section 11 includes three or more sub-channels 111, at least one of the sub-channels 111 located on both sides of the edge can be configured as a convex flow channel structure, and the sub-channel 111 located in the middle can be configured as a straight flow channel structure. The sub-channel 111 located between any two sections of the sub-channel 111 can also be configured as a flow channel structure in which both ends are expanded and the middle is contracted. At least one of the sub-channels 111 located on both sides of the edge can also be configured to have a convex flow structure, while any one sub-channel 111 in the middle to have a flow channel structure in which both ends are expanded and the middle is contracted.

Figure 3:
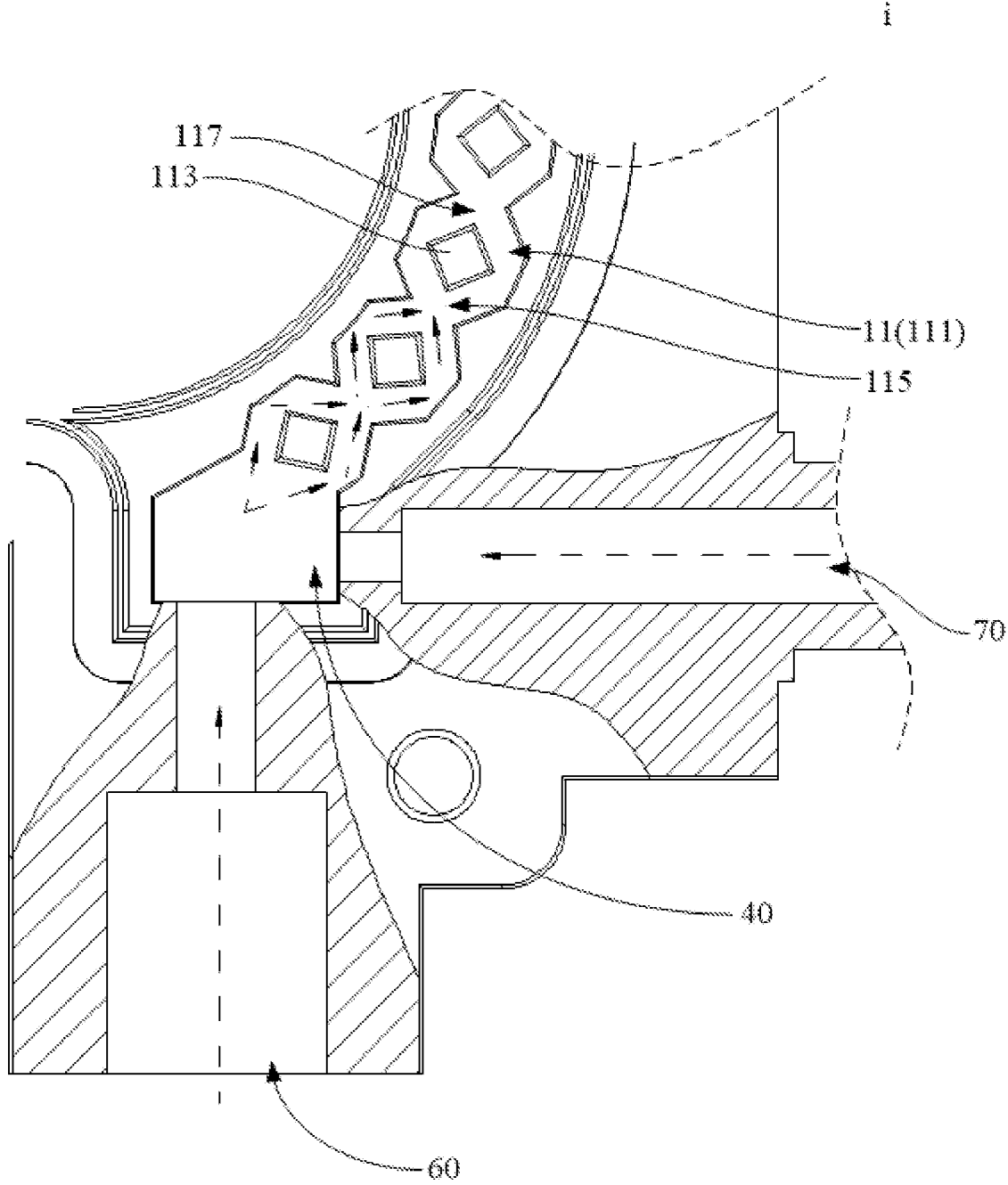
FIG. 3 is an enlarged view at an inlet position of a mixing channel in FIG. 2.

Please refer to FIGS. 2 and 3, in some embodiments of the present application, at least one diverter 113 is provided in the mixing section 11, and sub-channels 111 are formed on both sides of each diverter 113.

In this embodiment, the mixing section 11 is generally a tank structure, and the mixing section 11 is defined to have a width direction, and the width direction is the arrangement direction of each sub-channel 111 in the mixing section 11. The mixing section 11 is provided with at least one diverter 113, which is separated between the inlet end and the outlet end 117 of the mixing section 11 along the flow direction i, thereby forming a sub-channel 111 on both sides of the diverter 113. Compared with the method of providing multiple pipelines to form sub-channels, in this embodiment, by providing the mixing section 11 as a complete flow channel and providing the diverter 113 in the flow channel, the sub-channel 111 is not easily deformed and the structure is more stable.

Please refer to FIGS. 2 and 3, in some embodiments of the present application, the diverter 113 has a diverting part 1131 and a converging part 1133 connected in sequence along the flow direction i. The width of the diverting part 1131 gradually increases from the inlet end 115 to the side of the converging part 1133, and the width of the converging part 1133 gradually decreases from the diverting part 1131 to the outlet end 117.

In this embodiment, the diverter 113 includes a diverting part 1131 and a converging part 1133 connected in sequence along the flow direction i. The width of the diverting part 1131 gradually decreases along the flow direction i. The diverting part 1131 can be set as an angular structure, or the diverting part 1131 can be set as an arc-shaped structure protruding toward the open end. With this arrangement, when the gas-liquid mixture flows to the diverter 113, it will be divided by the diverting part 1131, and the divided gas-liquid mixture flows to the sub-channels 111 on both sides of the diverting part 1131 respectively. During this process, the gas-liquid mixture will impact the diverter 113, which can also reduce the surface tension of the water in the gas-liquid mixture, thereby accelerating the dissolution rate and amount of carbon dioxide and making the gas-liquid mixture uniform.

The width of the converging part 1133 gradually shrinks along the flow direction i. The converging part 1133 can be set as an angular structure, or the converging part 1133 can be set as an arc-shaped structure protruding toward the open end, thereby forming the converging section 1113 at the position corresponding to the converging part 1133 in the sub-channel 111. When the gas-liquid mixture flows out from the converging section 1113 of the sub-channel 111, under the guidance of the converging section 1133, the gas-liquid mixture rushes toward the gas-liquid mixture flowing out of other sub-channels 111, increasing the impact force between various gas-liquid mixtures. It can effectively reduce the surface tension of water in the gas-liquid mixture, and allow the gas-liquid mixtures to fully collide, accelerating the dissolution efficiency and uniformity of carbon dioxide.

In addition, in the embodiment of the present application, multiple diverters 113 arranged in an array can also be provided in the mixing channel to achieve multiple diversion, collision and aggregation, improving the dissolution effect.

Figure 6:
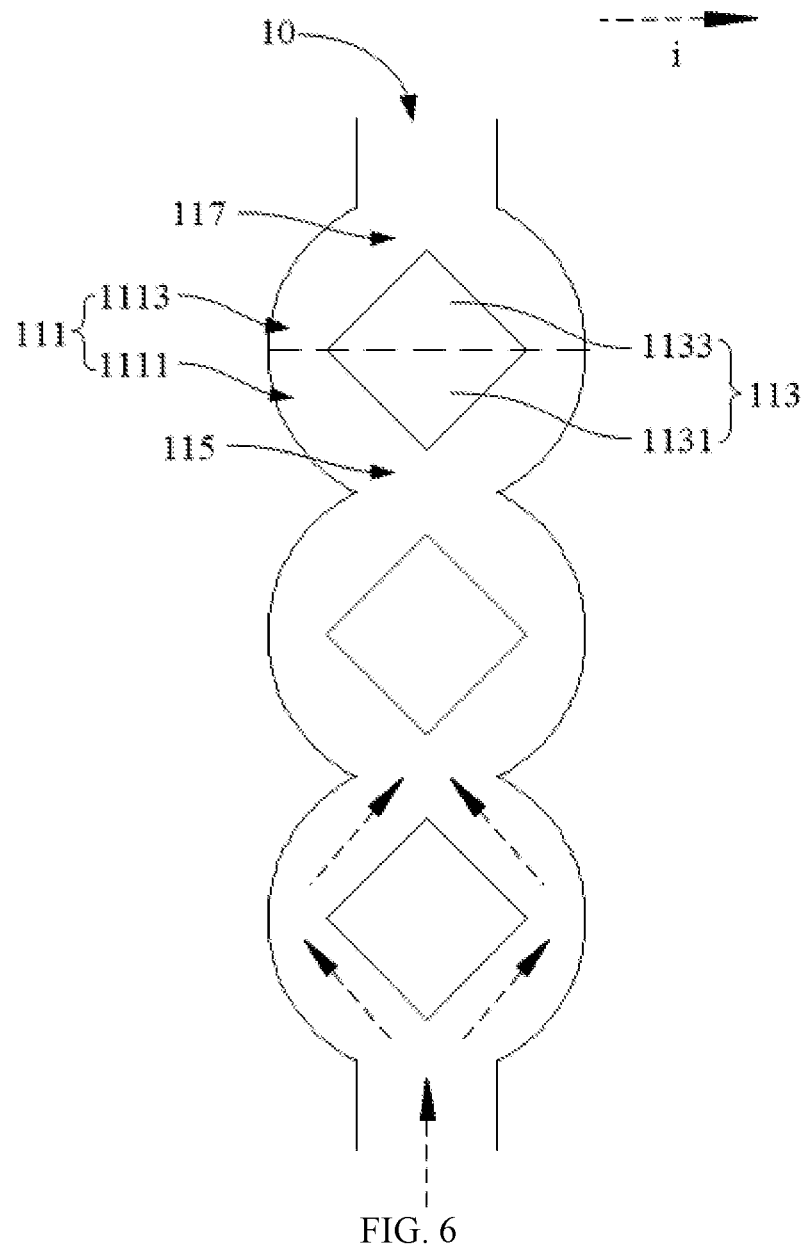
FIG. 6 is a structural view of the mixing channel in the sparkling water mixer according to another embodiment of the present application.
Figure 7:
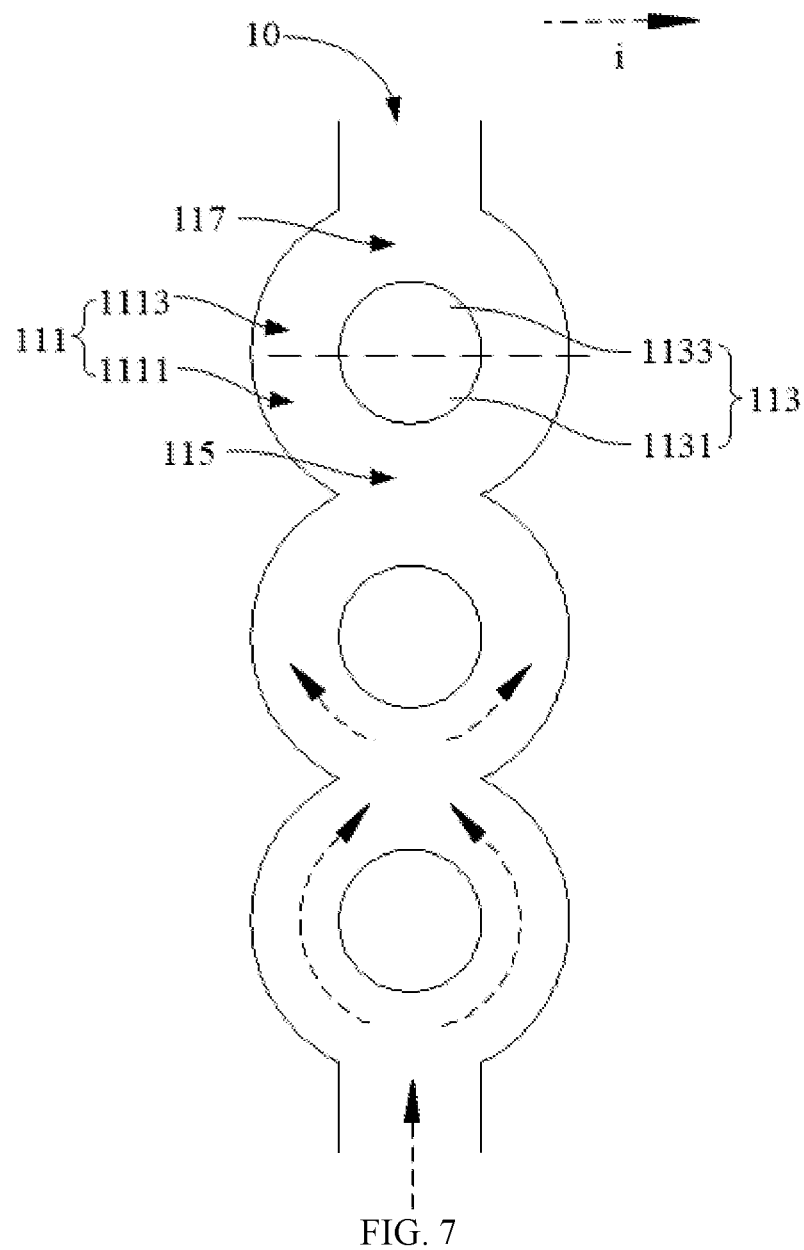
FIG. 7 is a structural view of the mixing channel in the sparkling water mixer according to another embodiment of the present application.

Please refer to FIGS. 6 and 7, in some embodiments of the present application, the side wall of the diverter 113 facing the sub-channel 111 is a convex folded or arc surface.

In this embodiment, the diverting part 1131 and the converging part 1133 of the diverter 113 can be transitioned in an arc at the connection position, and also through folding surfaces. The side walls of the diverting part 1131 and the converging part 1133 can be directly intersected to form an edge. With this arrangement, the gas-liquid mixture can smoothly flow into the converging part 1133 along the arc-shaped transition area, thereby reducing flow resistance.

Referring to FIGS. 6 and 7, in some embodiments of the present application, the end profile of the diverting part 1131 facing the inlet end 115 is a tip or arc surface.

In this embodiment, the end profile of the diverting part 1131 facing the inlet section can be a tip. With this arrangement, when the gas-liquid mixture flows to the diverter 113, it can flow to both sides of the diverter 113 along the tip, thereby preventing part of the gas-liquid mixture from rebounding and flowing back when the gas-liquid mixture impacts the diverter 113. In addition, in some embodiments, the end profile of the diverting part 1131 facing the inlet end 115 can be set as an arc surface; such an arrangement can increase the impact area between the air-liquid mixture and the diverter 113 and improve the solubility at the diverter 113, and the gas-liquid mixture will also be divided by the arc surface to avoid the problem of rebound backflow.

Please refer to FIGS. 6 and 7, in some embodiments of the present application, the end profile of the converging part 1133 facing the outlet end 117 is a tip or an arc surface.

In this embodiment, the end profile of the converging part 1133 facing the outlet end 117 can be a tip, so that when the gas-liquid mixture in the sub-channel 111 flows out, it is guided to the outlet end 117 by the side wall of the converging part 1133. This avoids the problem of partial backflow of the gas-liquid mixture at the end of the converging part 1133. In some embodiments, the end of the tip or the outline of the entire converging part 1133 can also be set as an arc surface to avoid stress concentration at the end position of the converging part 1133, improving structural strength and stability.

The contour of the diverter 113 in the embodiment of the present application can be a circle, an ellipse, a polygon such as a rhombus or a hexagon, an oblong shape, a drop shape, and other regular or irregular structures.

Figure 8:
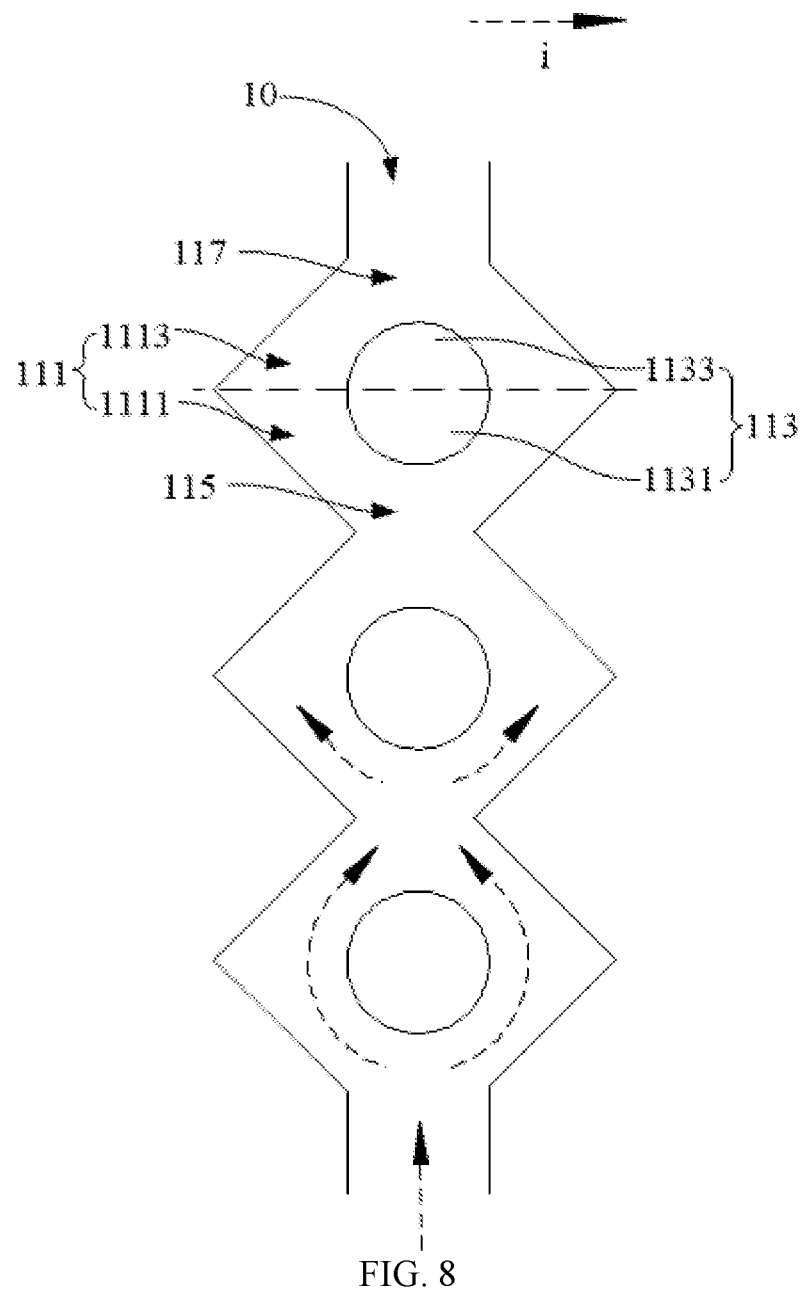
FIG. 8 is a structural view of the mixing channel in the sparkling water mixer according to another embodiment of the present application.

Please refer to FIGS. 6 to 8, in some embodiments of the present application, the cross section of the inlet end 115 gradually increases along the flow direction i; and/or, the cross-section of the outlet end 117 gradually decreases along the flow direction i.

In this embodiment, the cross section of the inlet end 115 of the mixing section 11 gradually increases along the flow direction i. With this arrangement, after the gas-liquid mixture enters the mixing section 11, the flow rate is first reduced and the gas-liquid mixture is dispersed, which can reduce the surface tension and increase the air-liquid contact area. This not only can facilitate the uniform distribution of the gas-liquid mixture into each sub-channel 111, but also help improve the dissolution efficiency and solubility of gas in the liquid; and improve the uniformity of gas-liquid distribution in the gas-liquid mixture.

In some embodiments, the cross section of the outlet end 117 of the mixing section 11 gradually decreases. With this arrangement, the gas-liquid mixture flowing out from each sub-channel 111 can be fully impacted and in contact, and the flow rate of the gas-liquid mixture can be increased, thereby improving the dissolution efficiency and solubility of gas in liquid, and improving the uniformity of gas-liquid distribution in the gas-liquid mixture.

It is sufficient only the cross-section of the inlet end 115 gradually decreases along the flow direction i; or only the cross-section of the outlet end 117 gradually decreases along the flow direction i; or the cross-sections of both the inlet end 115 and the outlet end 117 gradually decreases along the flow direction i. In addition, the side walls of the inlet end 115 and the outlet end 117 can be connected through a folded surface or an arc surface. As a result, the edge contour of the mixing section 11 forms polygonal structures such as triangles, rhombuses and hexagons or circles, ellipses, drop-shaped, oblong shape, and other regular or irregular structures.

Please refer to FIGS. 2 and 3, in some embodiments of the present application, the sparkling water mixer 1 also includes a premixing chamber 40 communicated with the inlet end 115. The sparkling water mixer 1 is provided with an air inlet 60 and a liquid inlet 70 that are communicated with the premixing chamber 40.

In this embodiment, in addition to a premixing chamber 40 located at the inlet end 115 of the mixing channel 10, and the sparkling water mixer 1 is provided with the air inlet 60 and the liquid inlet 70 that are communicated with the premixing chamber 40. With such an arrangement, the gas and liquid are first mixed through the premixing chamber 40 to form a gas-liquid mixture, and then the gas-liquid mixture enters the mixing channel 10 together, which is beneficial to improving the uniformity of gas-liquid distribution. Moreover, when the sparkling water mixer 1 is used, the sparkling water mixer 1 can be directly connected to the air supply structure and the water supply structure, thereby improving the convenience of usage of the sparkling water mixer 1.

In some embodiments, a liquid inlet joint 71 is provided at the liquid inlet 70 to facilitate connection to the water supply structure. An air inlet joint 61 can also be provided at the air inlet 60 to facilitate connection to the air supply structure.

Please refer to FIG. 2, in some embodiments of the present application, the mixing channel 10 is arranged around an outer side of the mixing chamber 20.

In this embodiment, the mixing channel 10 is formed on the peripheral side of the formation area where the mixing chamber 20 is opened. The mixing channel 10 can be located at a part of the edge of the forming area, or can be completely surround the entire forming area. Such arrangement makes the structural layout of the sparkling water mixer 1 compact, which can fully extend the length of the mixing channel 10 and increase the air-liquid mixing effect while reducing the volume of the sparkling water mixer 1, achieving a small-volume structural arrangement.

Please refer to FIG. 2, in some embodiments of the present application, the sparkling water mixer 1 is provided with at least two mixing chambers 20 communicated sequentially, and the communication channel 30 between two adjacent mixing chambers 20 gradually narrows in the channel direction.

In this embodiment, at least two mixing chambers 20 communicated sequentially are formed in the sparkling water mixer 1. The outlet of the mixing channel 10 is communicated with the mixing chamber 20 located at the head end, and the mixing chamber 20 located at the end in the flow direction i is communicated with the liquid outlet 50 of the sparkling water mixer 1. Each mixing chamber 20 is provided with an impeller 21 and an impact part 23.

It can be understood that, as in the above embodiment, when the gas-liquid mixture enters the mixing chamber 20, it can drive the impeller 21 in the mixing chamber 20 to rotate along the flow direction i of the gas-liquid mixture. Due to the centrifugal effect, the gas-liquid mixture will be thrown out from the impeller 21 and impact the impact part 23 provided on the peripheral side of the impeller 21, generating an instantaneous pressure several times normal pressure, thereby increasing the solubility of carbon dioxide. That is, a single mixing chamber 20 is enough to increase the solubility of carbon dioxide. If multiple mixing chambers 20 are connected in series, the gas-liquid mixture entering the sparkling water mixer 1 can repeat the above-mentioned process of increasing the solubility of carbon dioxide multiple times, so that carbon dioxide can be further dissolved in the liquid, resulting in a solution with high solute concentration.

Since each mixing chamber 20 has undergone the above-mentioned process of increasing the dissolution of carbon dioxide, carbon dioxide is continuously dissolved in the liquid, the volume of the fluid in the mixing chamber 20 will continue to decrease, and the pressure in the mixing chamber 20 will also decrease accordingly. In some embodiments, the cross-sectional area of the communication channel 30 between two adjacent mixing chambers 20 gradually decreases along the flow direction i. Under certain conditions, because the cross-section of the pipe diameter through which the liquid flows becomes smaller, the flow rate increases. According to Bernoulli's principle, the flow rate increases at the outlet where the cross-section becomes smaller. This helps to increase the speed of impeller 21 and the kinetic energy of impact, thereby improving the solubility of the gas-liquid mixture in the next mixing chamber 20.

The cross-sectional area of the communication channel 30 will gradually decrease along the flow direction i of the gas-liquid mixture. When the inner diameter of the communication channel 30 gradually becomes smaller, the flow rate of the liquid in the channel will become faster. Therefore, the gas-liquid mixture flowing through the communication channel 30 has a faster flow rate and impact force, and can keep moving and further accelerate in the flow direction i. therefore, after leaving the channel, the gas-liquid mixture can obtain higher kinetic energy, and when it impacts the blades of the impeller 21, the rotation speed of the impeller 21 can be increased. With this arrangement, the impeller 21 can more effectively divide and mix the gas and liquid phases in the mixing chamber 20, and the gas-liquid mixture that collides with the impact part 23 can also instantly cause a greater change in momentum, so that carbon dioxide has a better dissolution effect.

Figure 4:
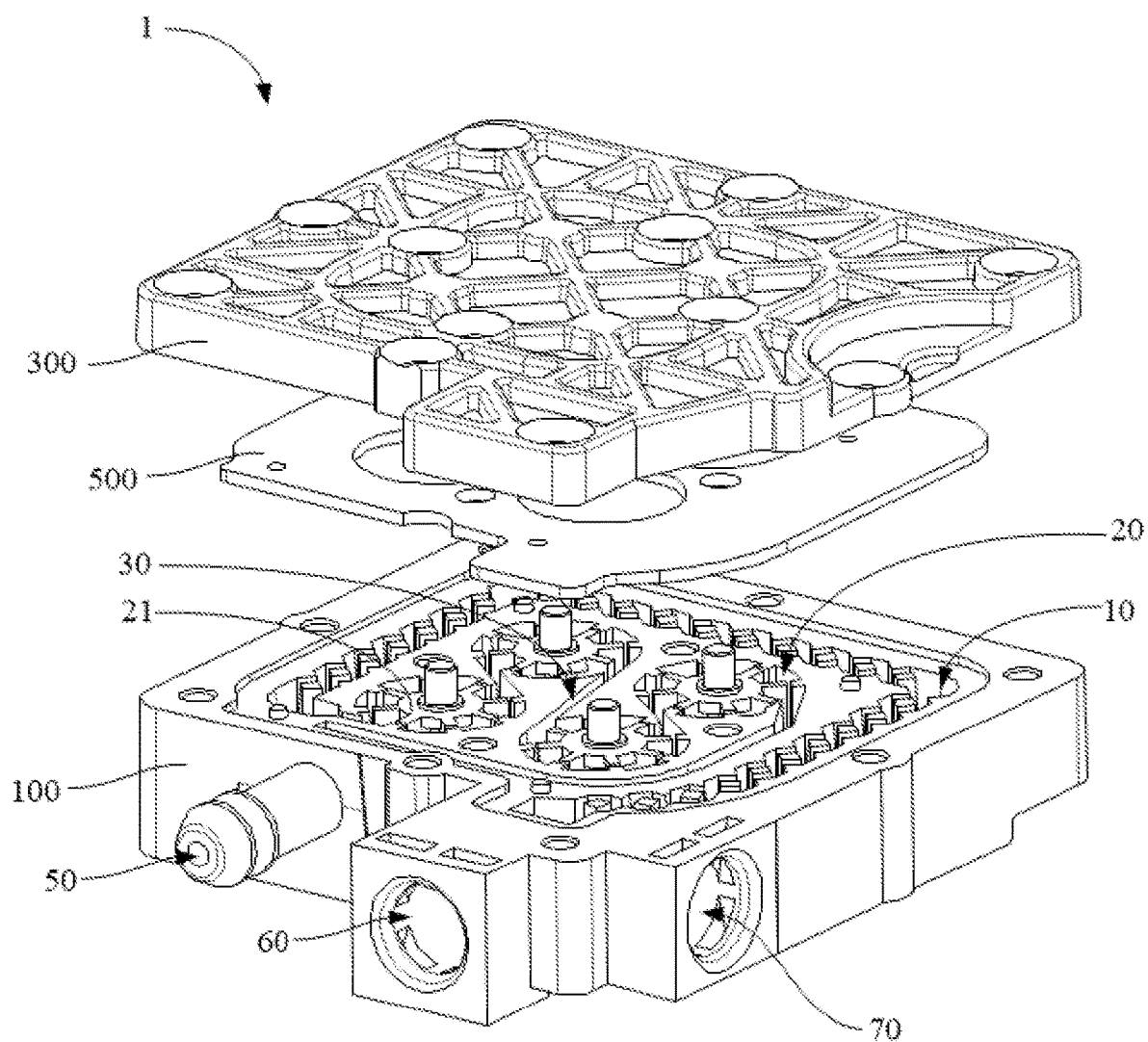
FIG. 4 is an exploded view of the sparkling water mixer according to an embodiment of the present application.
Figure 5:
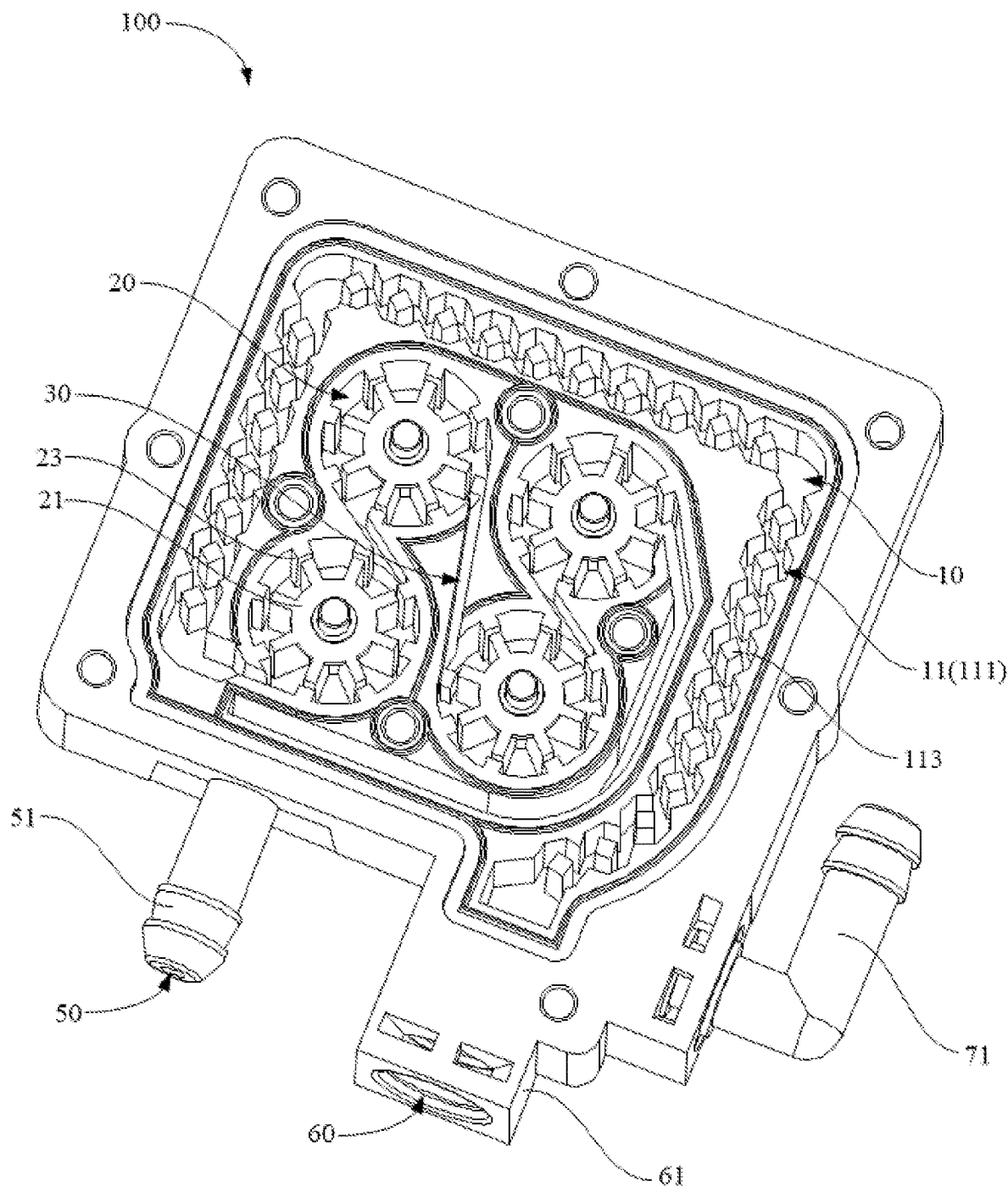
FIG. 5 is a schematic structural view of a base of the sparkling water mixer in FIG. 4.

Please refer to FIGS. 1 and 4, in some embodiments of the present application, the sparkling water mixer 1 includes a base 100, a cover 300 and a sealing member 500.

The surface of the base 100 is recessed to form the mixing channel 10 and the mixing chamber 20. The outer wall of the base 100 is provided with an air inlet 60 and a liquid inlet 70 that are communicated with the mixing channel 10 and a liquid outlet 50 communicated with the mixing chamber 20.

The cover 300 is provided on the surface of the base 100 and covers the mixing channel 10 and the mixing chamber 20.

The sealing member 500 is sandwiched between the base 100 and the cover 300 and is provided to surround the periphery of the mixing channel 10 and the mixing chamber 20.

In this embodiment, the sparkling water mixer 1 includes the base 100 and the cover 300. The surface of the base 100 is recessed to form a trough structure of the mixing channel 10 and the mixing chamber 20. The cover 300 is provided to cover the base 100 and close an opening on the surface of the base 100. The base 100 is also provided with the air inlet 60 and the liquid inlet 70 that are communicated with the mixing channel 10. The base 100 and the cover 300 are detachably connected. The base 100 can be connected to the cover 300 through threads, or through fasteners. The fasteners can be bolts, which will not be described again here.

In an embodiment, the cover 300 and the base 100 are fixedly connected by bolts. The cover 300 is provided with a countersunk hole that is larger than the outer diameter of the bolt. The end surface of the base 100 facing the cover 300 is provided with a corresponding screw hole. The bolt can be provided in the countersunk hole and threaded to the base 100, thereby locking the cover 300 on the base 100. With this arrangement, the sparkling water mixer 1 has a stable installation structure, thereby having better stability and reliability.

Furthermore, a sealing member 500 is provided between the cover 300 and the base 100, and the sealing member 500 is provided to surround the openings of the mixing channel 10 and the mixing chamber 20 on the surface of the base 100. The sealing member 500 can be an elastic sealing member 500 such as sealant, rubber or silicone, etc. Such arrangement can make the sparkling water mixer 1 have better air tightness, avoid air leakage or liquid leakage, thereby ensuring the pressure in the mixing channel 10 and the mixing chamber 20, and improving the dissolution effect of carbon dioxide.

In an embodiment, a through hole is provided on the sealing member 500, and the bolt can pass through the through hole and be connected to the base 100, so that the sealing member 500 is firmly installed between the base 100 and the cover 300. With this arrangement, it is possible to fix the sealing member 500 to improve the positional stability of the sealing member 500 and prevent the sealing member 500 from slipping or loosening, thereby ensuring the sealing performance of the sparkling water mixer 1. In some embodiments, a groove can also be provided on the end surface of the base 100 facing the cover 300 and is provided to surround the periphery of the accommodation chamber. The sealing member 500 is provided in the groove and can engage with the end surface of the cover 300 facing the base 100. A groove can also be provided on the cover 300, and the sealing member 500 is provided in the groove and contacts the end surface of the base 100 facing the cover 300. The specific implementation can be set according to actual needs and is not limited here.

The present application also proposes a sparkling water machine, which includes the sparkling water mixer 1 as described in any one of the previous embodiments. Since the sparkling water machine proposed in the present application applies all the technical solutions of the foregoing embodiments, it has at least all the beneficial effects brought by the foregoing embodiments, which will not be described in detail here.

In an embodiment of the present application, the sparkling water mixer 1 further includes a pressure regulator 2, and the pressure regulator 2 is communicated with the liquid outlet 50.

In this embodiment, the liquid outlet 50 of the sparkling water mixer 1 is connected to the pressure regulator 2. By adjusting the pressure regulator 2 to an appropriate opening, it is possible to control the flow quantity and velocity of the sparkling water discharged from the liquid outlet 50 and convert the high-pressure chaotic fluid that has been pressurized by collision in the sparkling water mixer 1 into a conventional continuous fluid. Such an arrangement is beneficial for the sparkling water mixer 1 to distribute the sparkling water flowing out of the liquid outlet 50, while also maintaining the pressure at the liquid outlet 50 and ensuring a higher gas-liquid pressure in the mixing chamber 20, thereby further improving the dissolution effect of carbon dioxide. At this time, the relatively low pressure outside the liquid outlet 50, such as atmospheric pressure, can also cause the pressure accumulated inside the sparkling water mixer 1 to be quickly released through the liquid outlet 50, thus improving the safety of the sparkling water mixer 1.

In some embodiments, the cross-section of the fluid channel in the pressure regulator 2 gradually increases to slowly release the pressure of the sparkling water. Therefore, when the high-pressure chaotic fluid pressurized by collision in the sparkling water mixer 1 flows out from the small hole through the device, the collision is reduced and the pressure changes smoothly from high to low. The release of carbon dioxide in the sparkling water is reduced.

Figure 9:
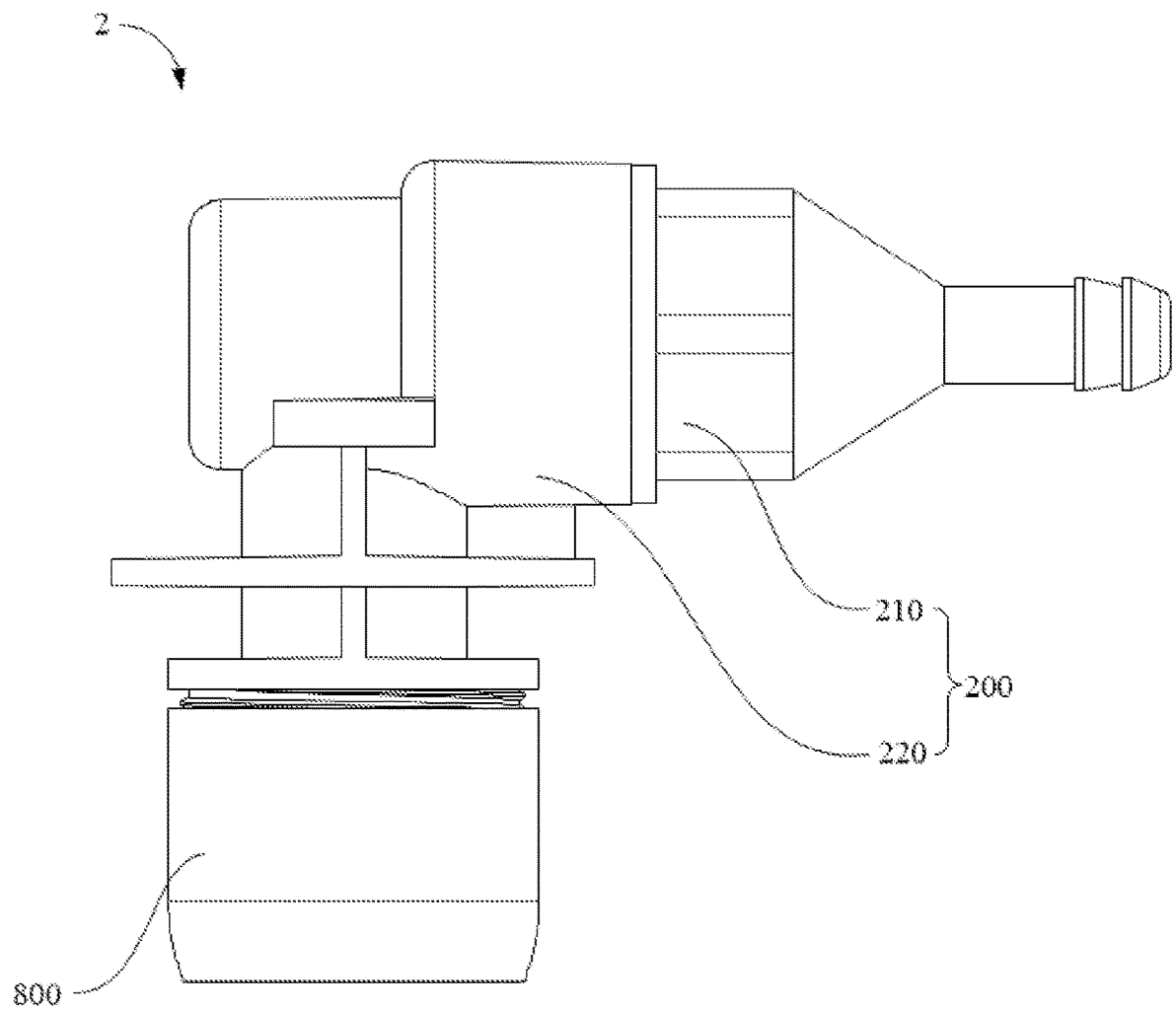
FIG. 9 is a structural view of a pressure regulator in a sparkling water machine according to an embodiment of the present application.
Figure 10:
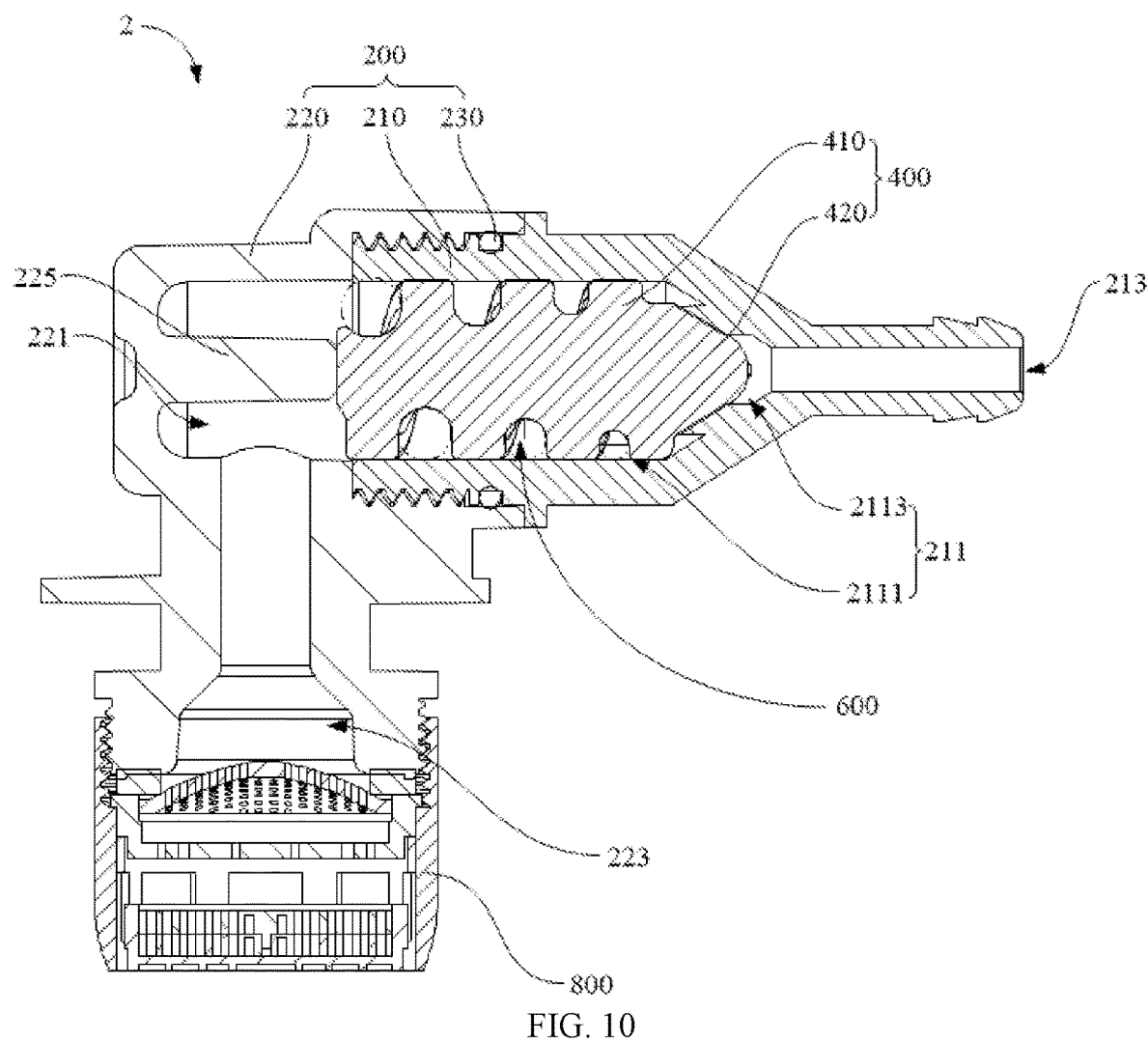
FIG. 10 is a cross-sectional view of the pressure regulator in the sparkling water machine according to an embodiment of the present application.
Figure 11:
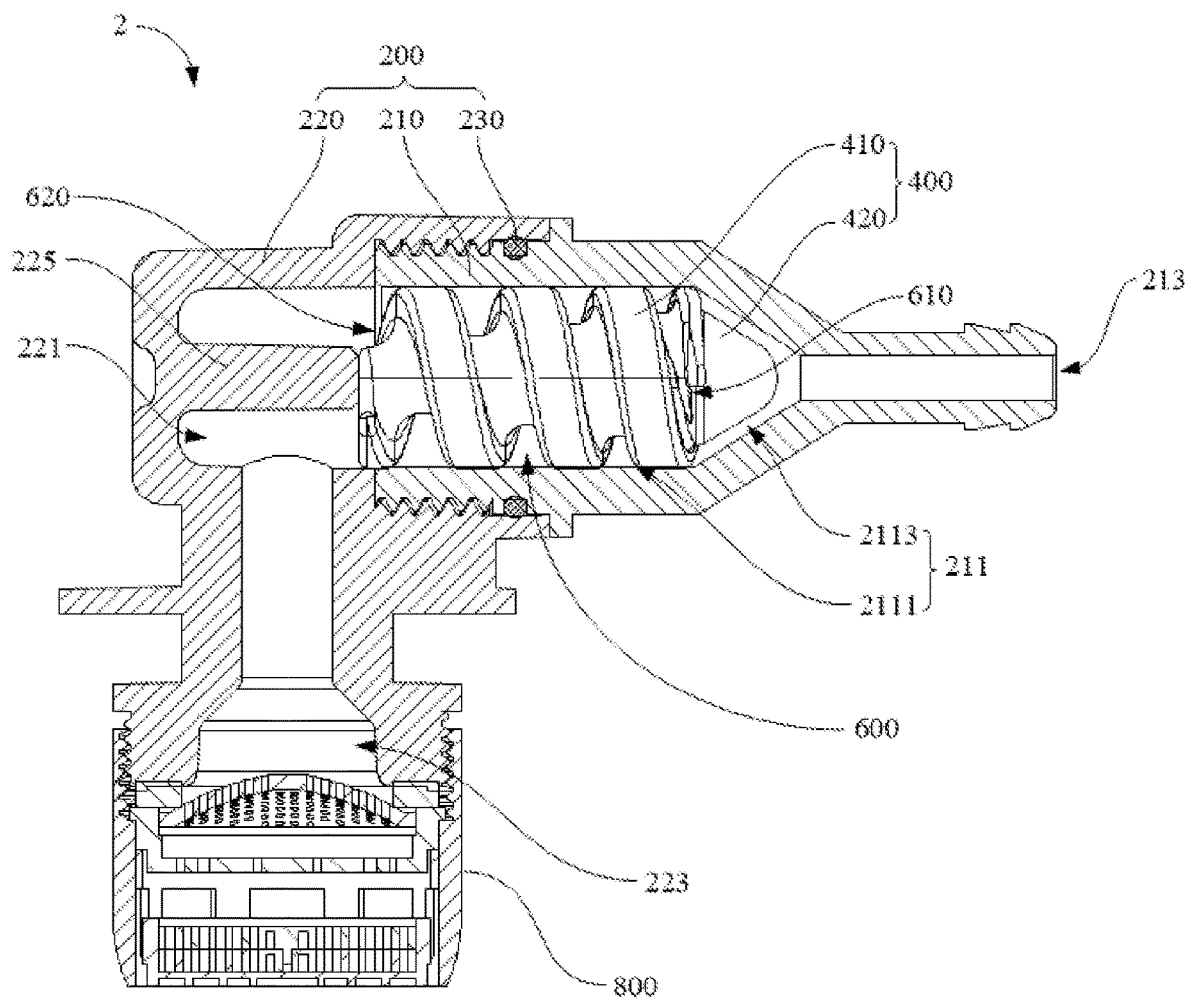
FIG. 11 is a cross-sectional view showing a flow-guiding member of the pressure regulator in FIG. 2.
Figure 12:
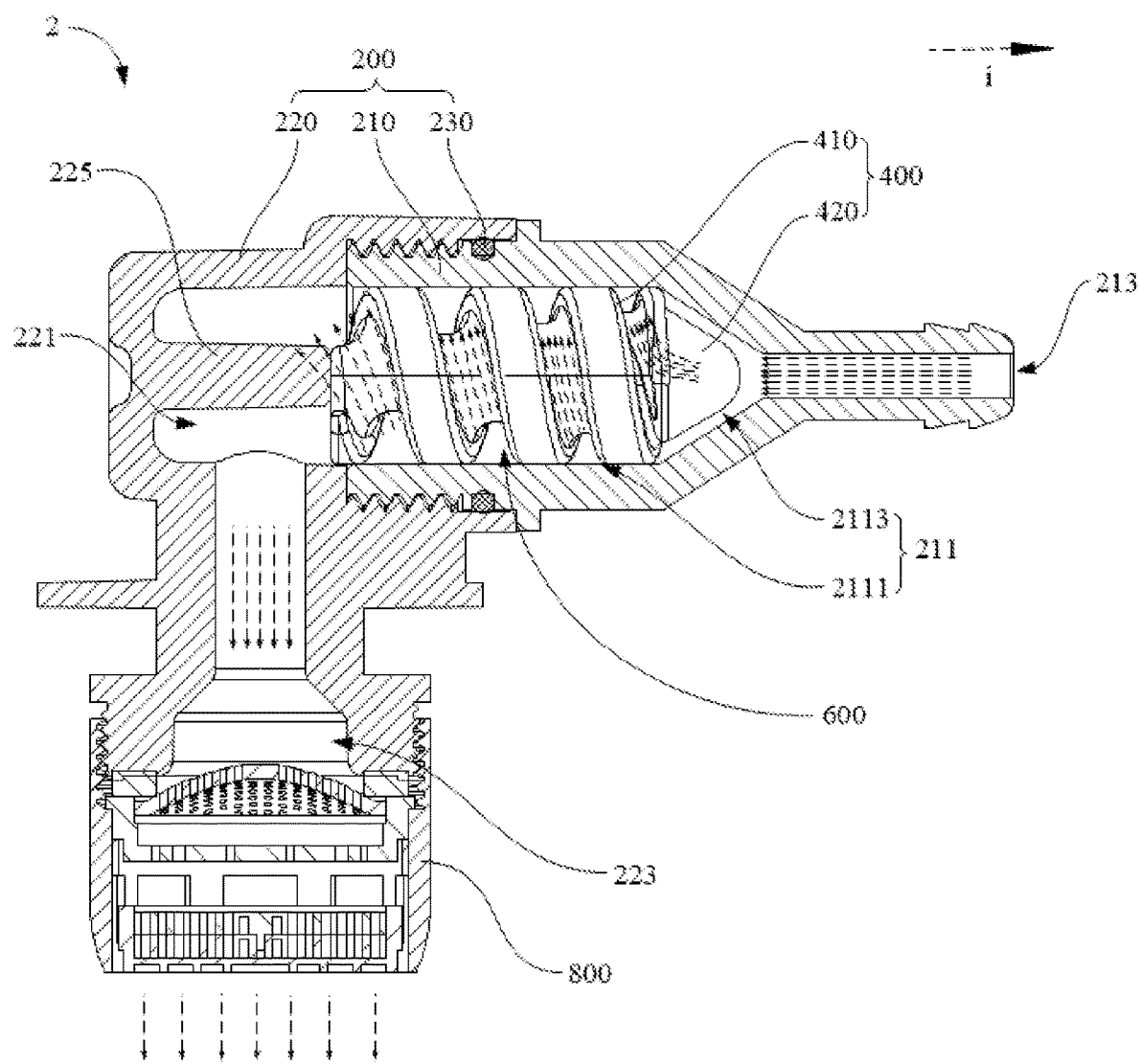
FIG. 12 is a schematic view of a flow direction when the pressure regulator is applied in the sparkling water machine according to an embodiment of the present application.
Figure 13:
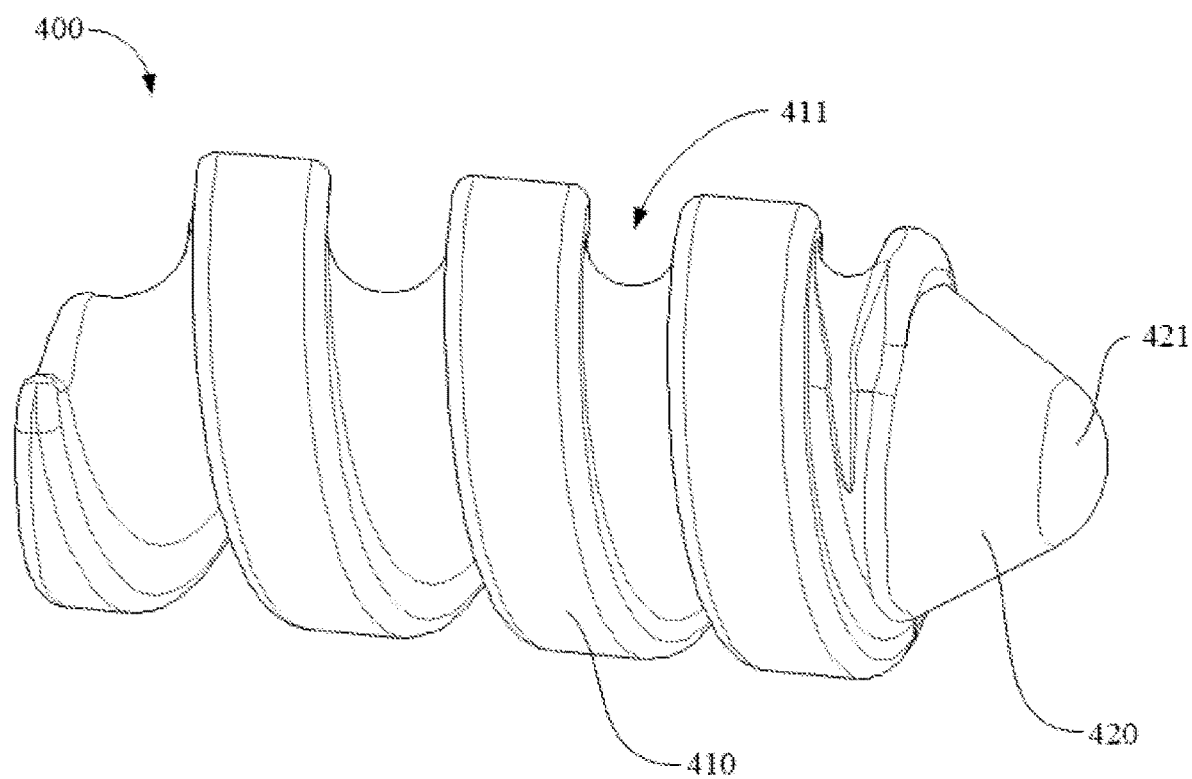
FIG. 13 is a structural view of the flow-guiding member of the pressure regulator in the sparkling water machine according to an embodiment of the present application.

Please refer to FIGS. 9 to 11, in some embodiments of the present application, an arc-shaped channel 600 and a transition chamber 221 are formed in the pressure regulator 2. The arc-shaped channel 600 has an input end 610 and an output end 620. The arc-shaped channel 600 can be a flow channel structure on the same plane, such as a semicircular flow channel, an elliptical flow channel, etc., or a three-dimensional flow channel structure, such as a spiral channel. The arc-shaped channel 600 can be formed by using a curved horn pipe, or can be formed by the matching structure of the housing 200 and the guide element 400 in the following embodiment, which is not limited here.

The cross section of the arc-shaped channel 600 gradually increases from the input end 610 to the output end 620. With this arrangement, when the sparkling water enters the arc-shaped channel 600, the pressure and flow rate of the sparkling water gradually decrease. In addition, the sparkling water is guided by the arc-shaped channel 600, continuously changing the flow direction i. The original linear flow when entering from the inlet 213 of the pressure regulator 2 is changed to the tangential direction along the arc-shaped channel 600. In this way, it is possible to avoid the high water pressure and velocity of the sparkling water when entering the transition chamber 221, which may strongly collide with the chamber wall of the transition chamber 221, resulting in gas release loss in the sparkling water. In addition, the arc-shaped channel 600 prevents high-pressure and high-speed sparkling water from directly ejecting from the input end 610 to the output end 620, resulting in failure to achieve a good decompression and deceleration effect.

After the sparkling water flows from the output end 620 of the arc-shaped channel 600 into the transition chamber 221, the transition chamber 221 is used to further reduce the pressure and decelerate, and the chaotic fluid rushing out of the arc-shaped channel 600 can be transformed into a normal continuous fluid and discharged from the discharge port 223 of the pressure regulator 2. The flow rate of sparkling water flowing out of the discharge port 223 can also be controlled by controlling the opening of the discharge port 223 of the transition chamber 221, which is beneficial for the sparkling water machine to distribute the sparkling water flowing out of the discharge port 223, and to control and maintain the pressure at the discharge port 223, thereby improving the safety of the sparkling water machine.

Please refer to FIGS. 10 and 11, in some embodiments of the present application, the arc-shaped channel 600 is a spiral channel.

In this embodiment, the arc-shaped channel 600 is a spiral channel. When the distance between the inlet 213 of the pressure regulator 2 and the transition chamber 221 is constant, the spirally extending flow channel structure can increase the length of the arc-shaped channel 600, thereby extending the flow path of the sparkling water. On the contrary, if a preset length of the arc-shaped channel 600 is required, the arc-shaped channel 600 is configured as a spiral structure, so that the space occupied by the arc-shaped channel 600 can be reduced and the size of the pressure regulator 2 can be reduced. In addition, under the condition that the length of the arc-shaped channel 600 is extended, the cross-sectional change trend of the arc-shaped channel 600 can be relatively gentle, reducing the acceleration of the sparkling water during the decompression and deceleration process, and reducing the gas release and loss of the sparkling water during the the arc-shaped channel 600. If the cross-sectional change trend of the arc-shaped channel 600 is determined, extending the length of the arc-shaped channel 600 can increase the pressure reduction and deceleration amplitude of the sparkling water, which make the water pressure and velocity of the sparkling water when entering the transition chamber 221 smaller to reduce the gas release and loss of the sparkling water after entering transition chamber 221.

Please refer to FIGS. 10 and 11, in some embodiments of the present application, the pressure regulator 2 includes a housing 200 and a guide element 400. A pressure regulating chamber 211 and a transition chamber 221 are formed in the housing 200, and an inlet 213 and a discharge port 223 are formed in the housing 200. The pressure regulating chamber 211 is communicated with the inlet 213, the guide element 400 is provided in the pressure regulating chamber 211, and the outer wall of the flow guide chamber is bonded to the inner wall of the pressure regulating chamber 211.

A spiral groove 411 is formed in at least one of the outer wall of the guide element 400 and the inner wall of the pressure regulating chamber 211 to form a spiral channel between the guide element 400 and the inner wall of the pressure regulating chamber 211.

In this embodiment, the pressure regulator 2 includes a housing 200 and a guide element 400 provided in the housing 200. The pressure regulating chamber 211 and a transition chamber 221 communicated with the pressure regulating chamber 211 are formed in the housing 200. The housing 200 is provided with an inlet 213 communicated with the pressure regulating chamber 211 and a discharge port 223 communicated with the transition chamber 221. The contour of the pressure regulating chamber 211 can be a straight cylinder structure, a tapered cylinder structure, a truncated cone structure, or a combination of different shapes. One end of the pressure regulating chamber 211 facing the transition chamber 221 is communicated with the transition chamber 221. The inlet 213 provided on the housing 200 can be connected to the side wall of the end of the pressure regulating chamber 211 away from the transition chamber 221, or to one end of the pressure regulating chamber 211 away from the transition cavity 221.

The guide element 400 is provided in the pressure regulating chamber 211, and the shape of the flow guide 400 is adapted to the shape of the pressure regulating chamber 211. Moreover, a spiral groove 411 can be provided on the outer wall of the guide element 400; a spiral groove 411 can also be provided on the inner wall of the pressure regulating chamber 211; or a spiral groove 411 can be provided on both the outer wall of the guide element 400 and the inner wall of the pressure regulating chamber 211. This makes the outer wall of the guide element 400 and the inner wall of the pressure regulating chamber 211 bond to each other, so that there is only a gap at the position of the spiral groove 411 to form a spiral channel. When the spiral groove 411 is opened on both the outer wall of the guide element 400 and the inner wall of the pressure regulating chamber 211, the guide element 400 and the spiral groove 411 on the inner wall of the pressure regulating chamber 211 can be provided to opposite to each other. Alternatively, the guide element 400 and the spiral groove 411 on the inner wall of the pressure regulating chamber 211 can be communicated with each other, that is, the sparkling water can flow through the guide element 400 and the spiral groove 411 on the inner wall of the pressure regulating chamber 211 in sequence.

The pressure regulator 2 is formed by the combination of the housing 200 and the guide element 400 to form a spiral channel, compared to the method of providing a spiral tube in the pressure regulator 2, the structure of the pressure regulator 2 is more stable and difficult to bend and deform.

Please refer to FIGS. 10 to 13, in some embodiments of the present application, the pressure regulating chamber 211 includes a pressure regulating section 2111 and a guide section 2113. The inlet 213 and the pressure regulating section 2111 are respectively located on two opposite sides of the guide section 2113. The guide element 400 includes a cylindrical guide part 410 and a tapered guide part 420. The cylindrical guide part 410 is provided in the pressure regulating section 2111, a spiral channel is formed between the cylindrical guide part 410 and the inner wall of the pressure regulating section 2111, and the input end 610 of the spiral channel is communicated with the guide section 2113.

The tapered guide part 420 gradually contracts in the direction away from the cylindrical guide part 410, and the end surface of the tapered guide part 420 is an arc surface 421. The tapered guide part 420 is provided in the guide section 2113 and is spaced apart from the cavity wall of the guide section 2113.

In this embodiment, the guide element 400 in the pressure regulator 2 includes a cylindrical guide part 410 and a tapered guide part 420 connected to the cylindrical guide part 410. The cylindrical guide part 410 can have a shape such as a cylinder, an elliptical cylinder, a prism and a truncated cone. The tapered guide part 420 is provided at one end of the cylindrical guide part 410. The tapered guide part 420 gradually contracts in a direction away from the cylindrical guide part 410, which can be in the shape of a pyramid, and makes the end surface of the conical guide part 420 an arc surface 421.

The guide element 400 is provided as a whole in the housing 200 of the pressure regulator 2 and is located in the pressure regulating chamber 211. The pressure regulating chamber 211 is defined to have two sections, namely the pressure regulating section 2111 for accommodating the cylindrical guide part 410 and the guide section 2113 for accommodating the conical guide part 420. The shape contour of the pressure regulating section 2111 is adapted to the cylindrical guide part 410, so that the inner wall of the pressure regulating section 2111 is bonded to the outer wall of the cylindrical guide part 410. The spiral groove 411 can be provided on the outer wall of the guide element 400; a spiral groove 411 can also be provided on the inner side section of the pressure regulating section 2111; or the spiral groove 411 is provided on both the outer wall of the guide element 400 and the inner wall of the pressure regulating section 2111. A spiral channel can be formed between the cylindrical guide part 410 and the inner wall of the pressure regulating section 2111.

The contour size of the guide section 2113 is larger than that of the tapered guide section 420, so that the tapered guide section 420 and the inner wall of the guide section 2113 are spaced apart to form a diversion space, and the diversion space is communicated with the input end 610 of the spiral channel. The contour shape of the guide section 2113 can be adapted to the shape of the tapered guide section 420, that is, the cross section of the guide section 2113 gradually decreases in the direction away from the pressure regulating section 2111. The contour shape of the guide section 2113 can also be different from the shape of the guide section 2113, as long as the inner wall of the guide section 2113 is spaced apart from the tapered guide part 420. For example, the contour of the guide section 2113 can be the same as that of the pressure regulating section 2111 or set to another contour shape.

In this embodiment, the inlet 213 provided on the housing 200 is also provided on the side of the guide section 2113 away from the pressure regulating section 2111, and the inlet 213 is opposite to the arc surface 421 at the end of the tapered guide section 420. At this time, when the sparkling water enters the pressure regulating section 2111 from the inlet 213, the water flow collides with the arc surface 421 of the conical guide part 420, causing the water flow to be dispersed and flow to the diversion space between the conical guide part 420 and the inner wall of the guide section 2113. The arrangement of the arc surface 421 can also play a role in dispersing the impact force of the water flow and avoiding stress concentration.

The water flow entering the diversion space will gradually flow from the input end 610 of the spiral channel into the spiral channel, then rotate along the spiral channel to flow towards the output end 620, and flow out from the discharge port 223 of the housing 200 through the transition chamber 221. During this process, the direction of the water flow is changed to the tangential direction of the spiral channel, and as the spiral channel gradually expands, the pressure of the water flow gradually decreases, which can effectively achieve the purpose of decompression and deceleration of the sparkling water.

Please refer to FIGS. 10 and 11, in some embodiments of the present application, a limiting portion 225 is provided in the transition chamber 221, and one end of the guide element 400 away from the inlet 213 supports the limiting portion 225.

In this embodiment, a limiting portion 225 is provided in the transition chamber 221. The limiting portion 225 can be provided on the bottom wall of the transition chamber 221 opposite to the guide element 400, and extends to the side of the pressure regulating chamber 211 to make contact with the guide element 400. The limiting portion 225 can also be provided on the side wall of the transition chamber 221 adjacent to the pressure regulating chamber 211 for abutting the guide element 400 and avoiding the output end 620 of the spiral channel. The limiting portion 225 limits the guide element 400 to prevent the guide element 400 from moving toward the side of the transition chamber 221 and to maintain the positional stability of the guide element 400 and the structural stability of the pressure regulator 2. With this arrangement, even when the guide element 400 is impacted by the sparkling water or other external forces, the limiting portion 225 will support the guide element 400 to keep the position of the guide element 400 stable.

Please refer to FIGS. 9 to 11, in some embodiments of the present application, the housing 200 includes a first housing 210 and a second housing 220. The first housing 210 is provided with the pressure regulating chamber 211 and an inlet 213. The second housing 220 is provided with a transition chamber 221 and a discharge port 223, and the first housing 210 and the second housing 220 are sealedly connected.

In this embodiment, the housing 200 includes a first housing 210 and a second housing 220 that are detachably connected. The first housing 210 is formed with the pressure regulating chamber 211 and an inlet 213 communicated with the pressure regulating chamber 211. The first housing 210 is provided with a first connecting part for connecting to the second housing 220, and the first connecting part is provided with a through port communicated with the pressure regulating chamber 211. The second housing 220 is formed with a transition chamber 221 and a discharge port 223 communicated with the transition chamber 221, a second connecting part for connecting to the first housing 210 is provided on the second housing 220, and the second connecting part is provided with a communication port communicated with the transition chamber 221. The first housing 210 and the second housing 220 are connected to each other through the first connecting part and the second connecting part. The first connecting part and the second connecting part can be fitted with each other. Alternatively, an external thread can be provided on the outer wall of the first connecting part, and an internal thread can be provided on the inner wall of the second connecting part, so that the first connecting part and the second connecting part are threadedly connected. It is also possible to provide the external thread on the outer wall of the second connecting part, and the internal thread on the inner wall of the first connecting part. In addition, snap connection or bonding can also be used. The housing 200 is configured as a first housing 210 and a second housing 220 that are detachably connected, which facilitates the disassembly and assembly of the guide element 400 and facilitates the cleaning of the transition chamber 221, the pressure regulating chamber 211, the spiral channel, etc. in the housing 200.

In some embodiments, the housing 200 further includes a sealing structure 230, which can be a sealing ring or sealant. The sealing structure 230 is provided between the first connecting part and the second connecting part, which can improve the sealing performance when the first housing 210 and the second housing 220 are connected, and avoid water leakage or air leakage.

In addition, in some embodiments, the limiting portion 225 can be provided in the second housing 220, so that when the pressure regulating valve is assembled, the limiting portion 225 can limit the guide element 400 to prevent the guide element 400 from moving towards the transition chamber 221.

In an embodiment of the present application, the tangent line of the output end 620 of the arc-shaped channel 600 is tangent to the side wall of the transition chamber 221.

It can be understood that after the sparkling water flows into the arc-shaped channel 600, the water flow pressure, flow speed and water flow direction will all change. When the sparkling water flows out from the arc-shaped channel 600, under the action of inertia, the flow direction of the water will be roughly the same as the tangent direction of the output end 620 of the arc-shaped channel 600. In this embodiment, the tangent line of the output end 620 of the arc-shaped channel 600 is substantially tangent to the side wall of the transition chamber 221. With this arrangement, when the sparkling water flows out of the arc-shaped channel 600, it will flow along the side wall of the transition chamber 221 under the action of inertia, thereby preventing the sparkling water from entering the transition chamber 221 and then rushing to the wall of the transition chamber 221. That is, the sparkling water can flow into the transition chamber 221 more smoothly, reducing impact and reducing gas release from the sparkling water. In addition, the inner wall of the transition chamber 221 also serves as a flow guide to prevent the sparkling water from splashing in the transition chamber 221 or directly rushing towards the discharge port 223.

Please refer to FIG. 10 and FIG. 11, in some embodiments of the present application, the discharge port 223 is opened on the side wall of the transition chamber 221.

In this embodiment, the discharge port 223 for discharging sparkling water in the pressure regulator 2 is provided on the side wall of the transition chamber 221 to prevent the discharge port 223 from being opposite to the output end 620 of the arc-shaped channel 600. With this arrangement, it is possible to prevent the sparkling water from flowing out of the output end 620 of the arc-shaped channel 600 and rushing directly to the discharge port 223, resulting in the inability to regulate the output flow rate and the pressure of the discharge port 223 through the transition chamber 221. By providing the discharge port 223 on the side wall of the transition chamber 221, the sparkling water will stay in the transition chamber 221, further reducing pressure and decelerating in the transition chamber 221. The chaotic fluid rushed out from the spiral channel will be transformed into a regular continuous fluid. Therefore, the flow rate of the sparkling water flowing out of the discharge port 223 can be adjusted by controlling the opening of the discharge port 223, and the pressure at the discharge port 223 can be controlled and maintained.

In some embodiments, the tangent line of the output end 620 of the arc-shaped channel 600 is substantially tangent to the side wall of the transition chamber 221, and the discharge port 223 is provided on the side wall of the transition chamber 221. With such an arrangement, the transition chamber 221 can better buffer the sparkling water, so that the sparkling water can be discharged from the discharge port 223 stably.

In an embodiment of the present application, the ratio A of the cross-sectional area of the output end 620 of the arc-shaped channel 600 to the cross-sectional area of the input end 610 satisfies the following relationship: 3.5≤A≤8, where A can be 3.5, 4, 4.5, 5, 5.5, 6, 6.5, 7, 7.5, 8 or any value between 3.5 and 8. The appropriate cross-sectional area ratio can be selected based on some parameters such as water pressure, velocity and flow rate of the input sparkling water, or based on parameters such as air pressure and water pressure input during the preparation stage. With such an arrangement, the arc-shaped channel 600 can fully play the role of depressurizing and decelerating the sparkling water, so that after the high-pressure and high-speed sparkling water flows through the arc-shaped channel 600, it can enter the transition chamber 221 relatively smoothly. For example, the cross-sectional area of the input end 610 can be approximately 2.8 mm$^2$, and the cross-sectional area of the output end 620 can be approximately 15 mm$^2$.

Please refer to FIGS. 9 to 12, in some embodiments of the present application, the pressure regulator 2 further includes a sparkling structure 800, and the sparkling structure 800 is provided at the discharge port 223 of the pressure regulator 2.

In an embodiment of the present application, the pressure regulator 2 also includes a sparkling structure 800 provided at the discharge port 223. A bubbler of appropriate specifications can be selected and installed at the discharge port 223 of the pressure regulator 2, or the sparkling structure 800 can be formed directly on the pressure regulator 2. With this arrangement, after entering the sparkling structure 800 from the transition chamber 221, the sparkling water will be evenly dispersed and buffered by the sparkling structure 800, thus the flow rate of the sparkling water can be reduced, and the sparkling water with a smooth flow rate can be obtained, avoiding great impact on the user when receiving water.

The above are only some embodiments of the present application, and are not intended to limit the scope of the present application. Under the inventive concept of the present application, equivalent structural transformations made using the contents of the description and drawings of the present application, or direct/indirect application in other related technical fields, are included in the scope of the present application.

What is claimed is:

1. A sparkling water mixer, comprising a mixing channel and a mixing chamber communicated with the mixing channel,
    wherein the mixing channel has at least two mixing sections communicated in sequence, each of the at least two mixing sections comprises two sub-channels connected in parallel, inlets of the two sub-channels in the same mixing section are communicated with each other to form an inlet end of each of the at least two mixing sections, and outlets of the two sub-channels are communicated with each other to form an outlet end of each of the at least two mixing sections;
    an input port of the mixing chamber is communicated with an outlet of the mixing channel, and an output port of the mixing chamber is communicated with a liquid outlet of the sparkling water mixer; and
    a rotatable impeller and an impact part are provided in the mixing chamber, and the impact part is located in a periphery of the impeller and spaced apart from the impeller.

2. The sparkling water mixer of claim 1, wherein one of the two sub-channels has a diverting section and a converging section that are sequentially communicated in a flow direction, the diverting section gradually moves away from another sub-channel in the same mixing section in the flow direction, and the converging section gradually approaches the other sub-channel in the same mixing section in the flow direction.

3. The sparkling water mixer of claim 2, wherein a flow channel is formed in the sparkling water mixer, a diverter is provided in the flow channel, and the two sub-channels are formed on both sides of the diverter.

4. The sparkling water mixer of claim 3, wherein the diverter has a diverting part and a converging part that are connected in sequence in the flow direction, the diverting part has a width that gradually increases from the inlet end to a side of the converging part, and the converging part has a width that gradually decreases from the diverting part to the outlet end.

5. The sparkling water mixer of claim 4, wherein at least one of outer walls of the diverting part and the converging part transitions or intersects in an arc to form an edge.

6. The sparkling water mixer of claim 5, wherein one end of the diverting part facing the inlet of each of the at least two mixing sections is a tip or an arc surface.

7. The sparkling water mixer of claim 5, wherein one end of the converging part facing the outlet of each of the at least two mixing sections is a tip or an arc surface.

8. The sparkling water mixer of claim 1, wherein:
    the inlet end has a cross section that gradually increases in a flow direction; and/or
    the outlet end has a cross section that gradually decreases in the flow direction.

9. The sparkling water mixer of claim 1, wherein the mixing channel is provided to surround an outer side of the mixing chamber.

10. The sparkling water mixer of claim 1, wherein the sparkling water mixer is provided with at least two mixing chambers that are communicated in sequence, and a communication channel between two adjacent mixing chambers gradually narrows in a flow direction.

11. The sparkling water mixer of claim 1, further comprising:
    a premixing chamber communicated with the inlet of the mixing channel,
        wherein the sparkling water mixer is provided with an air inlet and a liquid inlet that are communicated with the premixing chamber.

12. The sparkling water mixer of claim 1, further comprising: a pressure regulator communicated with the outlet of the mixing chamber.

13. The sparkling water mixer of claim 1, further comprising:
    a base, wherein a surface of the base is recessed to form the mixing channel and the mixing chamber, and an outer wall of the base is provided with an air inlet and a liquid inlet that are communicated with the mixing channel as well as a liquid outlet communicated with the mixing chamber;

a cover, provided on the surface of the base, wherein the cover is configured to cover the mixing channel and the mixing chamber; and a sealing member, sandwiched between the base and the cover, wherein the sealing member is provided to surround a periphery of the mixing channel and the mixing chamber.

14. A sparkling water machine, comprising the sparkling water mixer of claim 1.

* * * * *